United States Patent [19]

Webster et al.

[11] Patent Number: 4,484,071

[45] Date of Patent: Nov. 20, 1984

[54] METHOD AND APPARATUS FOR DETERMINING THE LOCATION OF GRADUATED MARKS IN MEASURING APPLICATIONS

[76] Inventors: Peter-John Webster, 339 West Ave., Ferndale, Randburg, Transvaal Province; James B. Roulston, 14 Beech St., Bryanston Extension 3, Randburg, Transvaal Province, both of South Africa

[21] Appl. No.: 357,653

[22] Filed: Mar. 12, 1982

[51] Int. Cl.³ .............................................. H01J 5/16
[52] U.S. Cl. .......................... 250/237 G; 250/231 SE
[58] Field of Search ......... 250/231 SE, 231 P, 231 R, 250/237 G; 340/347 P; 356/395

[56] References Cited

U.S. PATENT DOCUMENTS 4,097,150 6/1978 Wu ................................... 250/237 G
4,109,147 8/1978 Heske .............................. 250/231 R
4,122,337 10/1978 Okuda et al. .................... 250/231 P

*Primary Examiner*—David C. Nelms
*Assistant Examiner*—J. Brophy
*Attorney, Agent, or Firm*—Stevens, Davis, Miller & Mosher

[57] ABSTRACT

Apparatus for determining the location of graduated marks in measuring comprising source means for emitting electromagnetic radiation towards electromagnetic radiation sensors, and a measuring mark moveable between the source means and the sensors from one measuring position to another in a direction of measurement transverse to the direction of radiation, the mark being adapted to cause a restriction in the cross-sectional measurement of radiation between the source means and the sensors, the sensors being adapted to detect the location of the radiation restriction by sensing radiation intensity proportional to the area of their receiving faces upon which such radiation falls in use.

12 Claims, 4 Drawing Figures

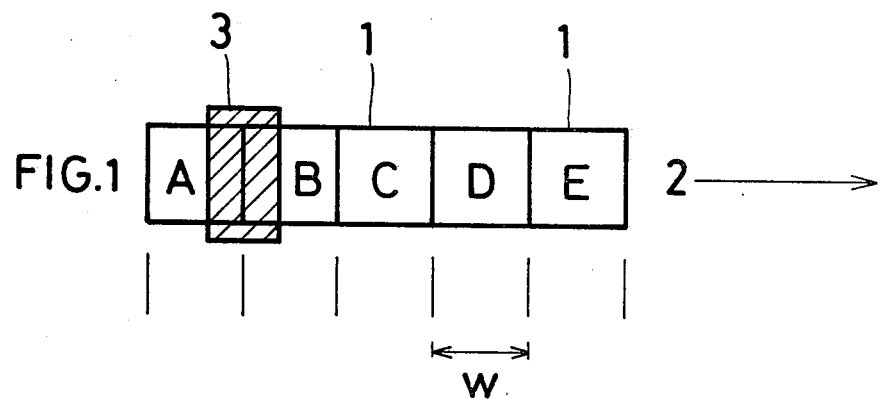
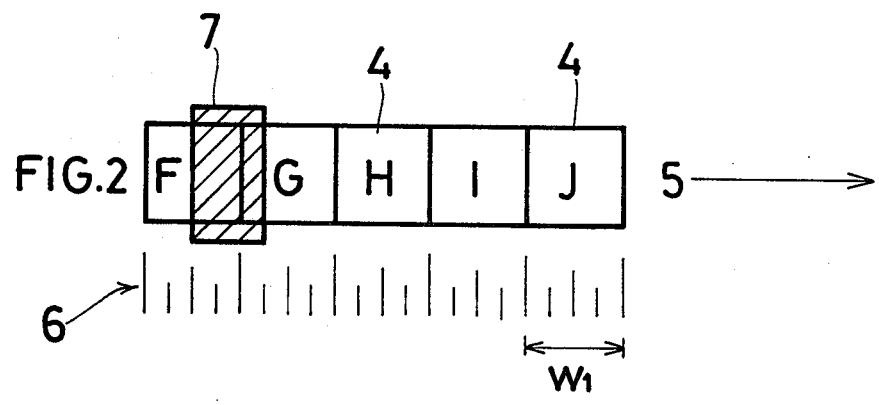
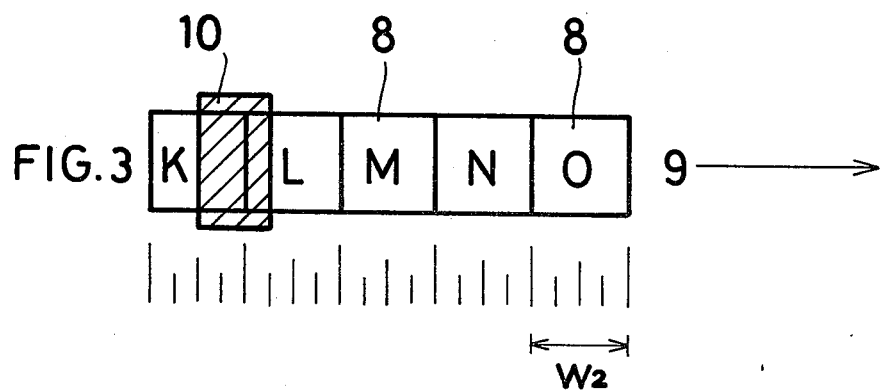

4,484,071

METHOD AND APPARATUS FOR DETERMINING THE LOCATION OF GRADUATED MARKS IN MEASURING APPLICATIONS

BACKGROUND TO THE INVENTION

This invention relates to a method of and apparatus for determining the location of graduated marks in measuring applications, and particularly to apparatus including at least one source of electromagnetic radiation and a plurality of electromagnetic radiation sensors.

Generally, this apparatus has a graduated mark or marks which move between the source and the sensors, the mark being opaque to the radiation and thus causing a radiation shadow to fall on the sensors. The sensors can be used to sense the position of the shadow and thus the mark. The mark movement is, of course, directly related to the measurement being taken.

The mark may alternatively be a gap in an otherwise opaque measuring scale, thus causing a slot of radiation to pass through the gap onto the sensors. The essential requirement is that the mark should cause a detectable restriction in the radiation passing beyond it.

One such measuring apparatus is more fully described in and forms the subject matter of, our co-pending South African patent application No. 79/1964 of even date entitled "Measuring Method and Apparatus".

OBJECT OF THE INVENTION

It is the object of this invention to provide a method and apparatus for determining the location of graduated marks in measuring applications.

SUMMARY OF THE INVENTION

According to the invention apparatus for determining the location of graduated marks in measuring apparatus comprises source means adapted to emit electromagnetic radiation, a plurality of electromagnetic radiation sensors, and at least one mark moveable between the source means and the sensors from one measuring position to another in a direction of measurement and being adapted to cause a restriction in the cross-sectional measurement of radiation between said means and sensors, the sensors being adapted to detect the location of the radiation restriction by sensing radiation intensity proportional to the area of their receiving faces upon which such radiation falls in use.

Features of the invention provide for there to be source means having one magnitude of radiation intensity and for the sensors to sense a plurality of magnitudes of intensities of radiation.

There is also provided for switching means for sequentially switching the source means to radiate a plurality of magnitudes of intensity, and for the sensors to detect one magnitude of intensity.

The invention also provided for a method of utilising apparatus as above described, comprising:
  directing electromagnetic radiation from a source means towards sensors therefor;
  causing a restriction in the cross-sectional measurement of radiation by a measuring mark between source means and sensors, the mark being moveable from one measuring position to another in a direction of measurement transverse to the radiation; and,
  detecting the location of the radiation restriction by sensing radiation intensity proportional to the sensor receiving faces.

Further features of the invention provide for the directing of the source means to emit at least one magnitude of radiation intensity, and for there to be detection of a plurality of magnitudes of radiation intensity falling on the sensor receiving faces.

Alternatively, there is provided for there to be a switching of the source means to sequentially emit a plurality of magnitudes of radiation intensity, there being a detection of at least one such magnitude. It will be appreciated that this alternative may be incorporated with the above features.

Still further, the detection of the radiation restriction location includes noting which sensors are detecting what magnitude of radiation intensity being emitted by which source at what magnitude of intensity.

BRIEF DESCRIPTION OF THE DRAWINGS

Preferred embodiments of the invention are described below by way of example only and with reference to the accompanying drawings in which:

FIG. 1 illustrates diagrammatically the determination of the location of a mark by apparatus of the type described and not embodying the invention;

FIG. 2 illustrates diagrammatically the determination of the location of a mark using a method and apparatus according to one embodiment of one aspect of the invention;

FIG. 3 illustrates diagrammatically the determination of the location of a mark using a method and apparatus according to an embodiment of another aspect of the invention.

DETAILED DESCRIPTION OF THE DRAWINGS

Figure 4:
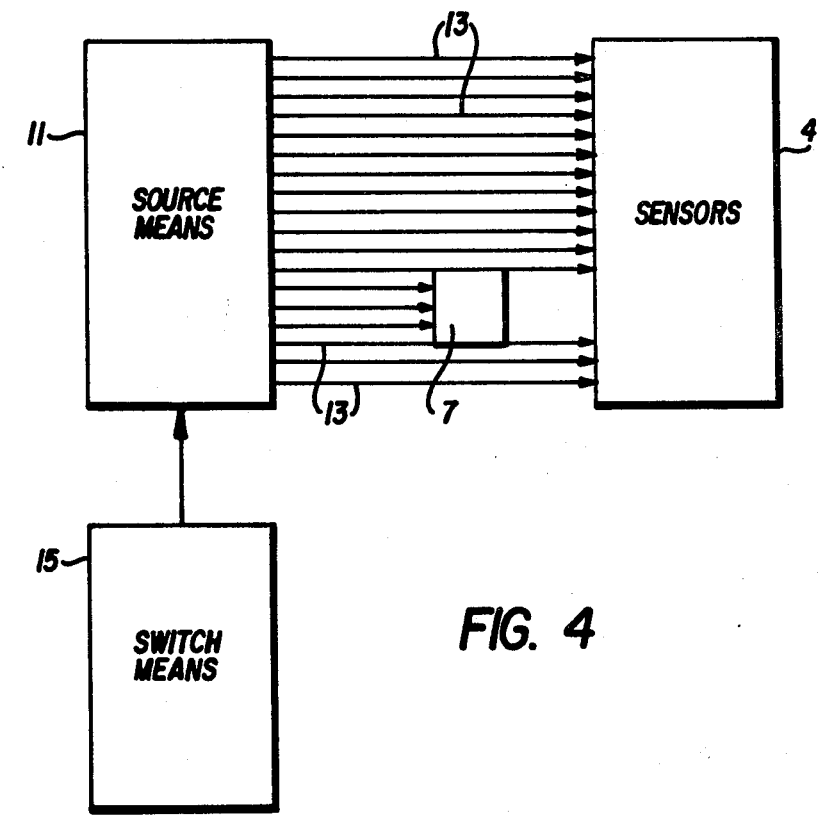
FIG. 4 illustrates in block diagram 4 a source means, switching means and sensors according to an embodiment of the present invention.

Referring to FIG. 1, five sensors 1 are shown adjacent one another in a direction of measurement 2.

The sensors are oblong in shape and have a width W; for purposes of reference they are labelled consecutively A through to E in FIG. 1.

A mark 3 is positioned above the sensors and below a source of electromagnetic radiation (not shown) to which the mark is opaque. The mark has a width which is equal to the width of a sensor 1.

Clearly if the mark 3 moves in the direction of measurement it will cast a radiation shadow on the sensors 1 which the sensors may detect and thereby provide an indication of the position of the mark.

In this apparatus the sensors 1 will indicate that they are receiving radiation only if their entire receiving surface is exposed thereto.

Assume the mark 3 covers the entire sensor A; this sensor will indicate that it is not receiving radiation, the remaining sensors will indicate radiation reception.

As soon as mark 3 moves slightly to the right, a portion of sensor B will be covered, and both sensors A and B will indicate no reception of radiation. A change in the sensors has occurred.

Clearly the next change of sensor detection will occur only when the mark 3 has moved sufficiently to the right as to cover the whole of sensor B; in this position sensor A will again indicate reception of radiation whereas sensor B will still indicate no reception.

Two changes in sensor detection will have occurred, and it will be appreciated that such changes will occur only at intervals of mark movement equivalent to one sensor width W. The resolution of mark location, and thus of measurement of the apparatus is therefore W.

Referring now to FIG. 2, sensors 4 have the same shape, switching sensitivity, the location relative to each other and to a direction of measurement 5, as above described sensors relative to measuring direction 2 in FIG. 1.

For ease of reference the sensors 4 are labelled consecutively F through to J. Each sensor 4 width, indicated by W1, is sub-divided into quarters on reference scale 6.

An electromagnetic radiation source 11 as shown in FIG. 4 is located above the sensors 4, a mark 7 of width W, being located between the source and the sensors 4.

The source emits electromagnetic radiation 13 of four different magnitudes of intensity: the first magnitude is that which is required to just cause a sensor 4 to indicate radiation reception when its whole surface is receiving radiation of first magnitude; the second magnitude is 4/3 times the first; the third magnitude is twice the first; and the fourth magnitude is four times the first.

It will be appreciated that the above choice of magnitudes has the following convenient effect: radiation of the second magnitude will cause a sensor to indicate radiation receiption when at least $\frac{3}{4}$ of its surface is receiving radiation; radiation of the third magnitude will cause a sensor to indicate radiation reception when at least half its surface is receiving radiation; and radiation of the fourth magnitude will cause a sensor to indicate radiation reception when at least $\frac{1}{4}$ of its surface is receiving radiation.

A switching means 15, as shown in FIG. 4 is adapted to switch the source sequentially between the different magnitudes of intensity.

Assume now that mark 7 covers the whole of sensor F. Sensor F indicates no radiation reception, the remaining sensors G to J indicate reception. This detection condition remains during the switching of the source.

Assume that mark 7 moves in direction 5 to expose less than $\frac{1}{4}$ of sensor F and is therefore covering less than $\frac{1}{4}$ of sensor 6. Sensor F will still indicate no radiation through the magnitude switching since the minimum area required (at magnitude 4) to be exposed is $\frac{1}{4}$ of its surface. Sensor G however, will no longer indicate radiation reception at magnitude 1, since less than the whole of its surface area is exposed to radiation. A change in detection condition has occurred.

Assume the mark 7 moves further in direction 5 and now $\frac{1}{4}$ of sensor F is exposed and $\frac{1}{4}$ of sensor G is covered. Sensor F will indicate no radiation reception until magnitude four is switched, when it will indicate reception since $\frac{1}{4}$ of its surface is exposed.

The detection condition of sensor G will remain unchanged: at magnitude one it will indicate no reception and at the other magnitudes, it will indicate reception. A second change in sensor detection has occurred.

Two changes have occurred and it will be appreciated that any two successive changes will only occur at intervals of $\frac{1}{4}$ of the width of a sensor, that is $\frac{1}{4}$ W1. The resolution of mark location and thus of measurement is $\frac{1}{4}$W1 or four times better than that obtainable as described with reference to FIG. 1.

Clearly the above applies only to sensors having subsections of its area which are directly and linearly proportional to the line therethrough in the direction of measurement.

If a circle were to be used as a sensor shape, the segments of the radius passing through each quarter of the circle area would not be linearly proportional to their areas.

In such cases, the magnitudes of intensity can be adjusted to be such that the segments are linearly proportional to their areas.

FIG. 3 shows five sensors 8 having the same shape, size and location relative to a direction of measurement 9 as previously described, the sensor width being W2.

The sensors are labelled consecutively K through to O for reference purposes, and have a mark 10, width W2, thereabove, the mark being below a radiation source (not shown) having a constant magnitude of intensity of radiation.

The sensors 8, however, will indicate four different magnitudes of intensity of radiation. Magnitude one will be indicated if source radiation of a constant magnitude of intensity is received over at least $\frac{1}{4}$ of its surface; magnitude two will be indicated if the source radiation is received over at least $\frac{1}{2}$ its surface; magnitude three will be indicated if the source radiation is received over at least $\frac{3}{4}$ its surface; and magnitude four will be indicated if source radiation is received over at least the whole of its surface.

Assume the mark 10 is covering the whole of sensor K; Sensor K indicates no reception at all and the remaining sensors all indicate reception of magnitude four, since their surfaces are wholely exposed to radiation.

Should mark 10 now move in direction 9 to expose less than $\frac{1}{4}$ of sensor K and therefore cover less than $\frac{1}{4}$ of sensor L the detection condition will be as follows: Sensor K will still indicate no reception since less than $\frac{1}{4}$ of it is exposed; sensor L, however, will now indicate magnitude three, since at least $\frac{3}{4}$ but not the whole, of its surface is exposed. A change in detection condition has occurred.

If mark 10 moves further in the direction 9 to expose $\frac{1}{4}$ of sensor K and over $\frac{1}{4}$ of sensor L, the detection condition will be sensor K indicating magnitude one, and sensor L remaining unchanged. A change has occurred in the detection condition.

Two changes have occurred and clearly each successive such change will occur at intervals of $\frac{1}{4}$ of a sensor area. Since $\frac{1}{4}$ of a sensor area is linearly proportional to its width, the resolution is $\frac{1}{4}$ W2.

It will be appreciated by those skilled in the art that an embodiment of the invention may include both aspects thereof if desired, that is, have a source of different magnitudes of intensity as well as sensors indicating a plurality of magnitudes received thereby.

What we claim as new and desire to secure by Letters Patent is:

1. Apparatus for determining the location of graduated marks in measuring apparatus comprising source means for emitting electromagnetic radiation, switching means for switching the source means to sequentially emit a plurality of magnitudes of intensity, a plurality of electromagnetic radiation sensors for sensing at least one magnitude of intensity of radiation and at least one mark moveable between the source means and the sensors from one measuring position to another in a direction of measurement transverse to the radiation to cause a restriction in the cross-sectional measurement of radiation between said means and sensors, the sensors for detecting a location of radiation restriction by sensing radiation intensity proportional to an area of sensor receiving faces upon which such radiation falls in use.

2. Apparatus as claimed in claim 1 in which the sensors sense a plurality of magnitudes of radiation intensity.

3. Apparatus as claimed in claim 2 in which all the sensor receiving faces have substantially a same shape and area and are located adjacent each other in the direction of measurement.

4. Apparatus as claimed in claim 3 in which the radiation restriction is dimensioned to just cover a whole sensor receiving face.

5. Apparatus as claimed in claim 4 in which there are four magnitudes of source radiation intensity, a first magnitude being that which is required to just cause a sensor to indicate radiation reception.

6. A method of determining the location of graduated marks in measuring applications comprising:
   directing electromagnetic radiation from a source means towards sensors therefor;
   switching the source means to sequentially emit a plurality of magnitudes of radiation intensity;
   causing a restriction in a cross-sectional measurement of radiation by a measuring mark between source means and sensors, the mark being moveable from one measuring position to another in a direction of measurement transverse to the radiation; and,
   detecting a location of the radiation restriction by sensing radiation intensity proportional to the sensor receiving faces, said detecting occurring by sensing at least one magnitude of said plurality of magnitudes.

7. A method as claimed in claim 6 in which the detection is achieved by sensing a plurality of magnitudes of intensity of radiation.

8. A method as claimed in claim 6 in which the detection of the location of the radiation restriction includes noting detection of radiation by each sensor with respect to a magnitude of radiation intensity being emitted by said source.

9. A method as claimed in claim 6 in which the radiation is directed from source means comprising a plurality of individual sources.

10. A method as claimed in claim 7 further comprising providing said sensors with sensor receiving faces all having substantially a same shape and area and located adjacent each other.

11. A method as claimed in claim 10 wherein said restriction is caused to have a dimension to just cover a whole sensor receiving face.

12. A method as claimed in claim 11 wherein said source means is switched to sequentially emit four magnitudes of source radiation intensity, a first magnitude being that which is required to just cause a sensor to indicate radiation reception.

* * * * *